(12) United States Patent
Menardais et al.

(10) Patent No.: US 12,463,955 B2
(45) Date of Patent: Nov. 4, 2025

(54) DATA TRANSMISSION METHOD, DEVICE AND CORRESPONDING PROGRAM

(71) Applicant: BANKS AND ACQUIRERS INTERNATIONAL HOLDING, Paris (FR)

(72) Inventors: Michaël Menardais, Saint-Menard-en-Jalles (FR); Loïc Tourlonias, Villeurbanne (FR); Mickael Bouyaud, Verrieres-le-Buisson (FR); Rémi Bertholet, Guilherand (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 233 days.

(21) Appl. No.: 18/039,627

(22) PCT Filed: Dec. 3, 2021

(86) PCT No.: PCT/EP2021/084116
§ 371 (c)(1),
(2) Date: May 31, 2023

(87) PCT Pub. No.: WO2022/117789
PCT Pub. Date: Jun. 9, 2022

(65) Prior Publication Data
US 2024/0015146 A1    Jan. 11, 2024

(30) Foreign Application Priority Data
Dec. 4, 2020    (FR) ........................................ 2012728

(51) Int. Cl.
*H04L 9/40*    (2022.01)

(52) U.S. Cl.
CPC ...... *H04L 63/0823* (2013.01); *H04L 63/0428* (2013.01); *H04L 63/166* (2013.01)

(58) Field of Classification Search
CPC ............... H04L 63/166; H04L 63/0485; H04L 63/0823; H04L 63/0428; H04L 63/10; G06F 21/606; G06F 21/74; G06F 21/62
USPC ...................................................... 726/26, 6
See application file for complete search history.

(56) References Cited

U.S. PATENT DOCUMENTS

| | | | | |
|---|---|---|---|---|
| 7,633,864 B2 * | 12/2009 | Johnson | .............. | H04L 63/0236 726/13 |
| 8,473,734 B2 * | 6/2013 | Wei | ....................... | H04L 63/166 713/153 |
| 8,595,814 B2 * | 11/2013 | Le | ......................... | H04L 9/3268 713/153 |

(Continued)

FOREIGN PATENT DOCUMENTS

WO    2013088180 A1    6/2013

*Primary Examiner* — Amare F Tabor
(74) *Attorney, Agent, or Firm* — Dilworth IP, LLC

(57) ABSTRACT

A method for transmitting data between a first electronic module including a general-purpose processor and a second electronic module including a secure processor, the two modules being combined in an electronic device, the first module executing a first operating system and the second module executing a second operating system, the modules each including a hybrid communication stack including, alongside components of layers 3 and 4 of the OSI model, a specialised data transmission component (ITP), connecting layers 3 and 4 of the OSI model.

10 Claims, 4 Drawing Sheets

(56) References Cited

U.S. PATENT DOCUMENTS

| | | | |
|---|---|---|---|
| 9,137,216 B2* | 9/2015 | Moskowitz | H04L 63/168 |
| 11,228,607 B2* | 1/2022 | Rodniansky | H04L 63/1425 |
| 2002/0138549 A1 | 9/2002 | Urien | |
| 2008/0137854 A1* | 6/2008 | Friday | H04L 63/105 |
| | | | 380/255 |
| 2013/0283364 A1* | 10/2013 | Chang | G06F 9/45558 |
| | | | 726/12 |
| 2014/0359306 A1* | 12/2014 | Sasao | G06F 21/554 |
| | | | 713/189 |

* cited by examiner

DATA TRANSMISSION METHOD, DEVICE AND CORRESPONDING PROGRAM

1. FIELD OF THE INVENTION

The field of the invention is that of electronic devices comprising an open module and a secure module. Such electronic devices can be modular or integrated. More precisely, the invention relates to a method for transmitting data between the constituent modules of an electronic device, in particular an electronic payment device.

2. BACKGROUND OF THE INVENTION

More and more frequently, modern data processing devices include a traditional data processing device (such as a communication terminal, a smartphone or a tablet) and a secure module (such as a payment terminal or a transactional terminal). These two devices are connected together to form a data processing device. Depending on implementation modes, either the data processing device consists of two independent devices, manufactured separately and connected together in different ways, or the two modules are integrated directly into the data processing device. The latter configuration is used more and more frequently: a single device is finally manufactured with on one side a processing module, operating in an open manner, and on another side a secure data processing module, operating in a "closed" manner and protected against fraud attempts, both software and hardware (physical protection of signal access) and software protection of data access. Whether integrated or composed of two devices (modules) manufactured independently, such a data processing device has the special feature of connecting together two modules having functions and architectures that are quite different from each other. For example, the open module is characterised by its openness and its modularity: the objective of such an open module is to allow users to perform the actions they want (for example merchants, in their shops, to record the products or services purchased by the customers), the open module therefore includes numerous applications. Thus, an open "sales" module comprises for example applications to place orders (i.e. scan articles) and/or to create a cart and/or return goods and/or prepare invoices and/or manage stocks, etc. The open module is based on an open architecture (for example Android®, Windows®, MacOS®, etc.). The open nature of this device (for example sales) allows the development of numerous business applications. This openness is therefore appreciated by the users. On the contrary, the secure data processing device (or module) is designed with a "closed" architecture to ensure that the data it processes, which is generally sensitive data, is not misused, stolen or used fraudulently. The secure module therefore includes technologies to maintain security and confidentiality in order to protect the data processed: secure processor, secure memory, physical security devices (lattices, shields, dummy keys, etc.). It may also comprise one or more communication interfaces (USB, Bluetooth, NFC, network) that are physical or virtualised (in other words connected to the physical interfaces of the open module).

A general problem which therefore arises in this type of data processing device is to ensure that the two modules (open and secure) can interact together, firstly by preserving the attraction provided by the open module in terms of access and work potential and secondly by continuing to guarantee the security of the data processed by the secure module.

Thus, for example, when the two devices are connected together (permanent or temporary connection) to perform a transaction (for example a payment transaction), the security of the transaction and of the data used must be guaranteed. A malicious application, that would be installed on the open device, must not be able to affect the transaction in progress by modifying and/or by obtaining protected data. To date, however, the two devices (or the two modules) communicate together by using technologies, mechanisms, protocols and standardised processes based on the OSI architecture, going from the application layer to the physical layer. Thus, for example, the well-known protocols such as TCP and IP are currently used to allow the two devices (or modules) to communicate. The implementation of these protocols is often standard and is based on the implementation in general-purpose or dedicated components, of libraries, which may consist of open source libraries. Thus, to date, when an application of the sales device wants to perform an operation with the data processing device, it therefore sends a series of TCP packets to a data processing application of the data processing device. However, these packets may contain, deliberately or not, fraudulent data or commands. This fraudulent data or these commands may have been forged without the user's knowledge further to an attack conducted directly on the open source library(ies) used to try to obtain secret or personal data (certificates, signatures, bank identifiers, etc.) from the secure data processing device. One solution could be to use a standard library and have it certified. However, such a solution does not guarantee that such a certification can be obtained and is very expensive.

There is therefore a need to provide a technique for checking the data required and supplied between the two devices, in particular to guarantee the overall security of the device while preserving its open nature.

3. SUMMARY OF THE INVENTION

The invention meets this need by proposing a method for transmitting data between a first electronic module comprising a general-purpose processor, called the open module, and a second electronic module comprising a secure processor, called the secure module, the two modules being combined in an electronic device, the first module executing a first operating system and the second module executing a second operating system, the open module comprises a hybrid communication stack comprising, alongside components of layers 3 and 4 of the OSI model, a specialised data transmission component, connecting layers 3 and 4 of the OSI model, and the secure module also comprising, alongside standard components of layers 3 and 4 of the OSI model, a hybrid communication stack comprising a specialised data transmission component, connecting layers 3 and 4 of the OSI model, the method comprising the following steps:

Reception, by a session management component of the hybrid communication stack of the open module, from an application running on the open module, of a request to transmit data to a destination application running on the secure module;

Determination, by the session management component, of a channel to transmit said data which is required by the application, depending on the content of said request; and When the application wants to transmit said data via the specialised data transmission component, a step of implementing said specialised data transmission component of the open module to transmit the data to the corresponding specialised data transmission component of the secure module.

Thus, in such a device, whether it is integrated or not, the data transiting between the open module and the secure module can be checked efficiently, in particular when the data is intended for a sensitive application running on the secure module. More generally, the invention relates to a method for transmitting data, in a device integrating an open module, executing an open operating system, and a secure module, executing an operating system qualified as secure (as opposed to the open operating system), the method comprising, during execution, by an application of the open module, of a transaction involving the use of sensitive data (such as payment data, biometric data or encryption keys, etc.), a phase of transmitting this data via the specialised component, combining layers 3 and 4 of the OSI system, with a specialised component of the same type located in the secure module, this transmission implementing all or some of the steps described herein.

According to a special characteristic, the step of implementing said specialised data transmission component of the open module comprises at least one step of checking the authorisation to transmit data from the application to the destination application. Thus, an attempt to transmit data from an application that would not be authorised to transmit such data to any service running on the secure module can be rejected immediately. This step of checking the authorisation can advantageously be implemented by the data transmission component of the secure module.

According to a special characteristic, the step of implementing said specialised data transmission component of the open module comprises at least one data serialisation step, according to a predetermined serialisation format.

Thus, a fraudulent application which would attempt to override the specialised data transmission component would not be able to easily serialise the data to be transmitted. According to a special embodiment, the step of implementing said specialised data transmission component of the open module comprises the following steps:

opening of a connection intended for a LibService component of the hybrid stack of the secure module;
creation, by an ITP component of the hybrid stack, of a buffer for receiving the data to be transmitted;
formatting, by the ITP component of the hybrid stack, of a buffer opening request intended for an ITP component of the hybrid stack of the secure module, said opening request comprising at least one identifier of the buffer for receiving the data to be transmitted and a pathname required for the transmission of said data;
transmission of said buffer opening request;
reception, from the ITP component of the hybrid stack of the secure module, of an acknowledgement of receipt of said request; and when the acknowledgement of receipt authorises the data transmission:

transmission of said data to said ITP component of the hybrid stack of the secure module; and
closure of the connection to the LibService component of the hybrid stack of the secure module.

According to a special characteristic, the buffer opening request comprises a buffer identifier and a certificate identifier.

Thus, the buffer opening request is secure since a certificate must be presented to authorise the data transmission.

According to a special characteristic, the method comprises, in the secure module, a step of checking said certificate identifier, and when the check of said certificate identifier delivers a negative result, a step of closing the connection. Thus, when an invalid certificate is presented, the data cannot be transmitted.

According to a special characteristic, the method comprises, in the secure module, a step of checking said certificate identifier, and when the check of said certificate identifier delivers a positive result, a step of transmitting the acknowledgement of receipt of said buffer opening request.

According to a special embodiment, after reception of said data by said ITP component of the hybrid stack of the secure module, it comprises a step of submitting the data to a filtering component; and when said data does not correspond to data expected for the destination application, a step of rejecting said transmitted data.

Thus, even if a fraudulent application manages to transmit data to the secure module, the data is checked to make sure that it complies with the specifications of the data intended for the destination application.

According to another aspect, the invention also relates to an electronic device combining a first electronic module comprising a general-purpose processor, called the open module, and a second electronic module comprising a secure processor, called the secure module, the first module executing a first operating system and the second module executing a second operating system, the open module comprises a hybrid communication stack comprising, alongside components of layers 3 and 4 of the OSI model, a specialised data transmission component, connecting layers 3 and 4 of the OSI model, and the secure module also comprising, alongside standard components of layers 3 and 4 of the OSI model, a hybrid communication stack comprising a specialised data transmission component, connecting layers 3 and 4 of the OSI model. Such a device further comprises:

means for receiving, by a session management component of the hybrid communication stack of the open module, from an application running on the open module, of a request to transmit data to a destination application running on the secure module;
means for determining, by the session management component, of a channel to transmit said data which is required by the application, depending on the content of said request; and
means for implementing said specialised data transmission component of the open module to transmit the data to the corresponding specialised data transmission component of the secure module executed when the application wants to transmit said data via the specialised data transmission component.

According to one embodiment of the electronic equipment according to the invention, the open module is a communication module and the secure module is a payment terminal. Lastly, the invention relates to a computer program product comprising program code instructions for the implementation of a method as described previously, when it is executed by a processor.

The invention also relates to a computer-readable storage medium storing a computer program comprising program code instructions to execute the steps of the method according to the invention as described above.

Such a storage medium can be any entity or module capable of storing the program. For example, the medium can comprise a storage means, such as a ROM, for example a CD ROM or a microelectronic circuit ROM, or a magnetic recording means, for example a USB flash drive or a hard disk. In addition, such a recording medium can be a transmissible medium such as an electrical or optical signal, that can be routed via an electrical or optical cable, by radio or by other means, such that the computer program it contains can be executed remotely. The program according to the invention can be downloaded in particular on a network, for example the Internet.

Alternatively, the recording medium can be an integrated circuit incorporating the program, the circuit being adapted to execute or to be used in the execution of the method of the above-mentioned invention.

4. BRIEF DESCRIPTION OF THE DRAWINGS

Other purposes, characteristics and advantages of the invention will appear more clearly on reading the description which follows given as a simple illustrative and non-limiting example, and referring to the attached figures, in which.

5. DETAILED DESCRIPTION OF THE EMBODIMENTS OF THE INVENTION

Figure 1:
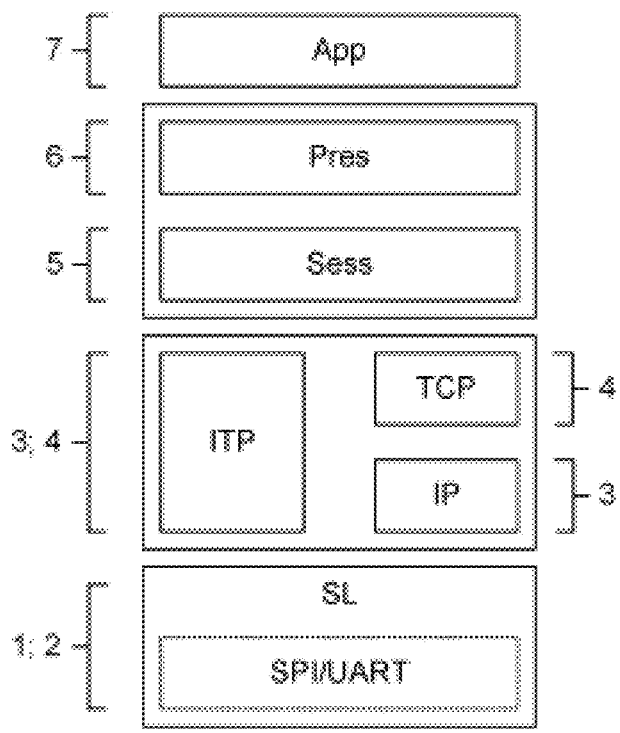
FIG. 1 shows the grouping of the network layers implemented by this technique.

The general principle of the invention is based on the interception and filtering, by at least one of the open or secure modules (also called the open device or secure device respectively) of the device (modular or not) for processing the data physically exchanged between the two modules via the physical link (wired) connecting the two processors of these modules (the processor of the open module is connected directly to the processor of the secure module), said physical link being of the SPI/UART type (referred to in the remainder of the document as SPI for greater clarity and to be more concise).

The invention concerns the management of the security of the data exchanged between an "open" module (device) and a "secure" module (device) integrated in the processing device, whether it is a modular processing device (in which the two modules can be physically connected or disconnected, without this affecting their individual operation when they are disconnected) or a completely integrated device where the two modules are physically connected in the device. The "open" module is qualified as such since it is managed by a user who can, depending on the specifications of this module, install therein software applications as required. This possibility is provided by the editor of the open module operating device (for example Android™ or iOS™). Insofar as it is accepted that these freely installable applications are not secure (in other words they can include all or some of the fraudulent modules) or that the user may themselves jeopardize the security of the open module by adopting unsuitable behaviour, the open module is by nature considered as not being secure, and therefore as potentially presenting risks for the operation of the secure module with which it is integrated in the processing device (risk of data theft or modification of the behaviour and/or function of the secure module). On the contrary, the secure module cannot be managed by the user: the manufacturer of the secure module does not authorise the installation of applications from public application stores and does not authorise the user to perform any action on this module. By nature, the secure module processes confidential or private data (bank data, biometric data, personal data) whose integrity and security must be preserved. However, in order to provide new services, "extended" data exchanges between these two devices are authorised and managed via the specific architecture described.

Thus, the two modules (the "open" module and the "secure" module) exchange data via a specific network stack portion imitating the operation of the corresponding network stack portion of the OSI model (the seven layers of these models are integrated in the open module and the secure module) with, however, a special handshake protocol. This last characteristic is important since it prevents most of the attacks on the secure module by harmful or fraudulent applications running on the open module. Such applications may attempt to transmit very large quantities of messages or data to the secure module in order to obtain confidential data. The use of a network stack dedicated to the communication between the two modules (two devices) integrated in the electronic device prevents these thefts of confidential data and/or modification of the secure module.

More particularly, each module (the open module and the secure module) has a standard network stack (from application layer 6 to physical layer 1), layer 7 being the application layer. This standard network stack allows each of the two devices to independently transmit and receive data to and from the outside (in other words with the servers to which these two devices are connected to transmit and receive data). Thus, via the standard stack, the open module can transmit and receive data from a processing server internal or external to the organisation in which the open module is assigned (for example, the open module can communicate, via its standard stack, with an order management server or an accounting server of a merchant, but also with a server used to download applications from a software supplier, located outside the merchant's communication network). Thus, via its standard stack, the secure module can communicate with one or more secure servers in order to perform, in a traditional manner, the secure data transmission and reception operations with these secure servers (for example, the secure module can communicate, via its standard stack, with a bank server, a server of a payment service provider, a server of a purchaser, but also with a server to update the secure module manufacturer's software. These two standard stacks are implemented, on the secure module and on the open module, via one or more dedicated hardware or software components for each device.

In addition, according to the invention, when the open module and the secure module need to communicate together (in other words when data needs to be exchanged between the open module and the secure module, for example payment data or any other sensitive information, such as biometric data, personal data, etc.), specific components implementing a specific network stack are used. The specific network stack, resulting from the use of one or more specific software or hardware components, is qualified as a secure stack. According to the invention, in a special embodiment, two components of the standard network stack are replaced by one component of the specific network stack. The two components replaced are the components of layer 3 (network, IP) and of layer 4 (transport, TCP/UDP). In the specific stack, these two components are replaced by a component called ITP, which manages both the network functionality (layer) and the transport functionality (layer). Thus, the open module and the secure module each have an ITP component (called indifferently the specialised component or the ITP component) which is used to transmit/receive information between the open module and the secure module, in some specific cases. Thus, in this embodiment, the standard stack comprises standard components whereas the specific stack comprises standard components and a specialised component, used to replace the standard components of layers 3 and 4. The standard components, which are not replaced, are common and shared by the two stacks. FIG. 1 explains the architecture of the components as described previously. The components common to the two stacks are: Presentation (Pres), Session (Sess), Serial Link (SL) with an SPI/UART component for direct communication between the two devices. The ITP component is specific (specialised) to the communication between the two modules of the device: it is only used to transmit certain types of specific data, for example payment data which must be exchanged between the open module and the secure module and vice versa, when executing a payment transaction for example.

The TCP and IP components are used in a standard manner for any other reception and/or transmission of data. As shown on FIG. 1, we therefore have a "secure" stack which is also hybrid, and which comprises an additional secure component (ITP). In addition, according to the invention, the stack of the secure module is provided with an additional filtering and deletion component. This component can be configured and is integrated in and/or separately from the ITP component.

In addition, still according to the invention, the standard components and the ITP components are connected to kernels of the devices. More particularly, for the open device, the (modified) components of the standard stack and the ITP component are integrated in the kernel of the operating device (in a non-modifiable memory, for example a ROM) and are signed and checked when starting the open device. This ensures that there is no possibility of using these components when their signature is different from a pre-recorded signature. The same applies for the secure module. These characteristics are additional and prevent, in particular as regards the open device, a malicious application from attempting to modify the standard network stack or the ITP component.

In other words, to guarantee the integration of the open module and of the secure module in the same device, the inventors had the idea of modifying the processing of the request (i.e. the transmission and reception of data) in the open module and the secure module. More particularly, the new "secure" stack is hybridised with the existing components to ensure more secure and more efficient processing of the commands from one of the devices in the device, this new hybrid stack implementing the ITP component dedicated exclusively to the exchanges between these two devices of the device. The hybrid stack can also be used for the interactions with other devices external to the device, without however using the ITP component. In addition to this new communication stack which in one embodiment performs the operations assigned to the TCP component and to the IP component, the stack is provided with a router (session, layer 5) which adapts its behaviour (routing towards ITP or TCP/IP) depending on the formatted data received from the presentation manager (layer 6), which structures the data received from the application layer (layer 7, application). According to the invention, the presentation manager (Pres, layer 6) uses a "Protocol Buffer" type mechanism to format the data received from the application layer, in a predetermined format. Once the formatting has been checked, the formatted and binarized data is obtained by the router of the session layer (layer 5) which, depending on the formatted and binarized data present in the buffer, routes it to the ITP component or to the TCP component.

Figure 2:
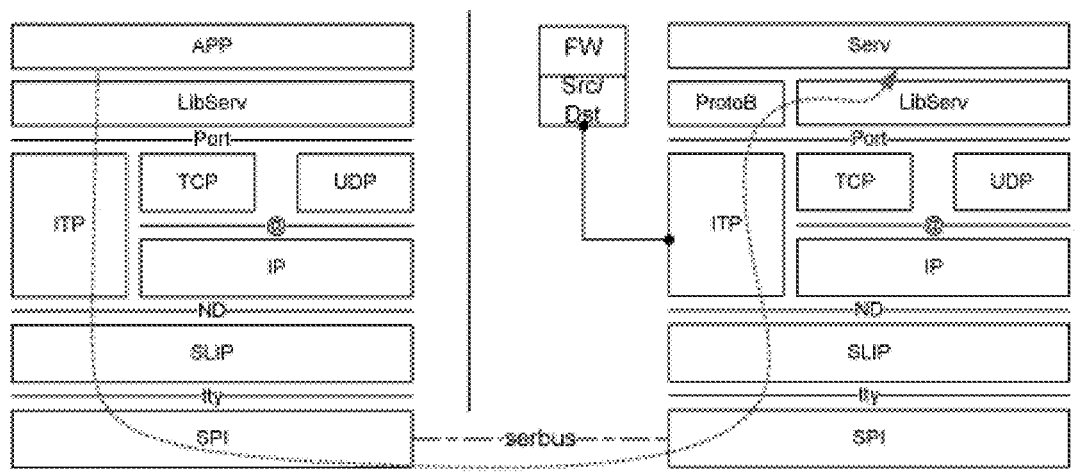
FIG. 2 shows a path taken by a request from an application of the open module to a service of the secure module.

FIG. 2 shows the logic for the transmission of data between the open module (device) and the closed module (device), with an application APP requesting a service (SERV) from the secure module.

In this example, the open module is provided with an SPI component, controlling a synchronous serial data bus (serbus) and operating in full-duplex mode. In this implementation, the circuits communicate on a master-slave basis, in which the master controls the communication. For example, the SPI component of the open module controls the communication with the equivalent SPI component of the secure module. The SPI component receives its encoded data from a SLIP component and encodes/decodes the data received from the SPI component before transmitting it to the IP component or to the new transmission stack. The SLIP component implements encoding and decoding functions for the SLIP packets according to the provisions of RFC 1055. It defines the encoding, decoding and validation functions, as well as a pilot class that can be used to implement a stack of SLIP protocols and classes of higher level which apply the SLIP protocol to the TCP/IP connections or to the SPI flows. The SLIP component receives its data (packets) either from the IP component of the conventional network stack, or from the specialised ITP component of the new secure stack (on the diagram, reception is from the ITP component, curved dotted line). To do this, the SLIP component has access to two different groups of buffers which each receive, from the component considered (ITP or IP), the data packets to be transmitted. According to this technique, the SLIP component operates by querying these transmission buffers in turn to extract the packets to be transmitted, perform the encoding of these packets and transmit them to the SPI component for actual transmission on the serial link between the two processors (CPU). The SLIP component also operates by receiving the packets from the SPI component, decoding them, identifying the reception buffer and depositing this packet in the corresponding reception buffer. Thus, the method implemented is for example as follows:

Reception, by the session management component (LibService) of the hybrid communication stack of the open module, from the application (APP) running on the open module, of a request to transmit data to a destination application (Serv) running on the secure module;

Determination, by the session management component (LibService), of a channel to transmit said data (traditional component or ITP component), depending for example on the request from the application; and When the application (APP) wants to transmit said data via the specialised data transmission component (ITP), a step of implementing the specialised data transmission component (ITP) of the open module to transmit the data to the corresponding specialised data transmission component (ITP) of the secure module.

This implementation of the specialised ITP component comprises:

opening of a connection intended for a LibService component of the hybrid stack of the secure module;

creation, by the ITP component of the hybrid stack, of a buffer for receiving the data to be transmitted;

formatting, by the ITP component of the hybrid stack, of a buffer opening request intended for an ITP component of the hybrid stack of the secure module, said opening request comprising at least one identifier of the buffer for receiving the data to be transmitted and a pathname required for the transmission of said data;

transmission of said buffer opening request;

reception, from the ITP component of the hybrid stack of the secure module, of an acknowledgement of receipt of said request; and when the acknowledgement of receipt authorises the data transmission:

transmission of said data to said ITP component of the hybrid stack of the secure module; and closure of the connection to the LibService component of the hybrid stack of the secure module.

In what follows and the foregoing, obviously, it is understood that the transmission steps described for a component of one of the two modules correspond to reception steps for the other module. It is also understood that the modules which transmit data are able to receive data, as is the case for the ITP components of the two modules. The invention relates to a method for transmitting data, in a device (for example a payment terminal such as an Android payment terminal or any other device) integrating an open module, executing an open operating system, and a secure module, executing an operating system qualified as secure (as opposed to the open operating system), the method comprising, during execution, by an application of the open module, of a transaction involving the use of sensitive data (such as payment data, biometric data or encryption keys, etc.), a phase of transmitting this data via the specialised component, combining layers 3 and 4 of the OSI system, with a specialised component of the same type located in the secure module, this transmission implementing all or some of the steps described herein.

Figure 3:
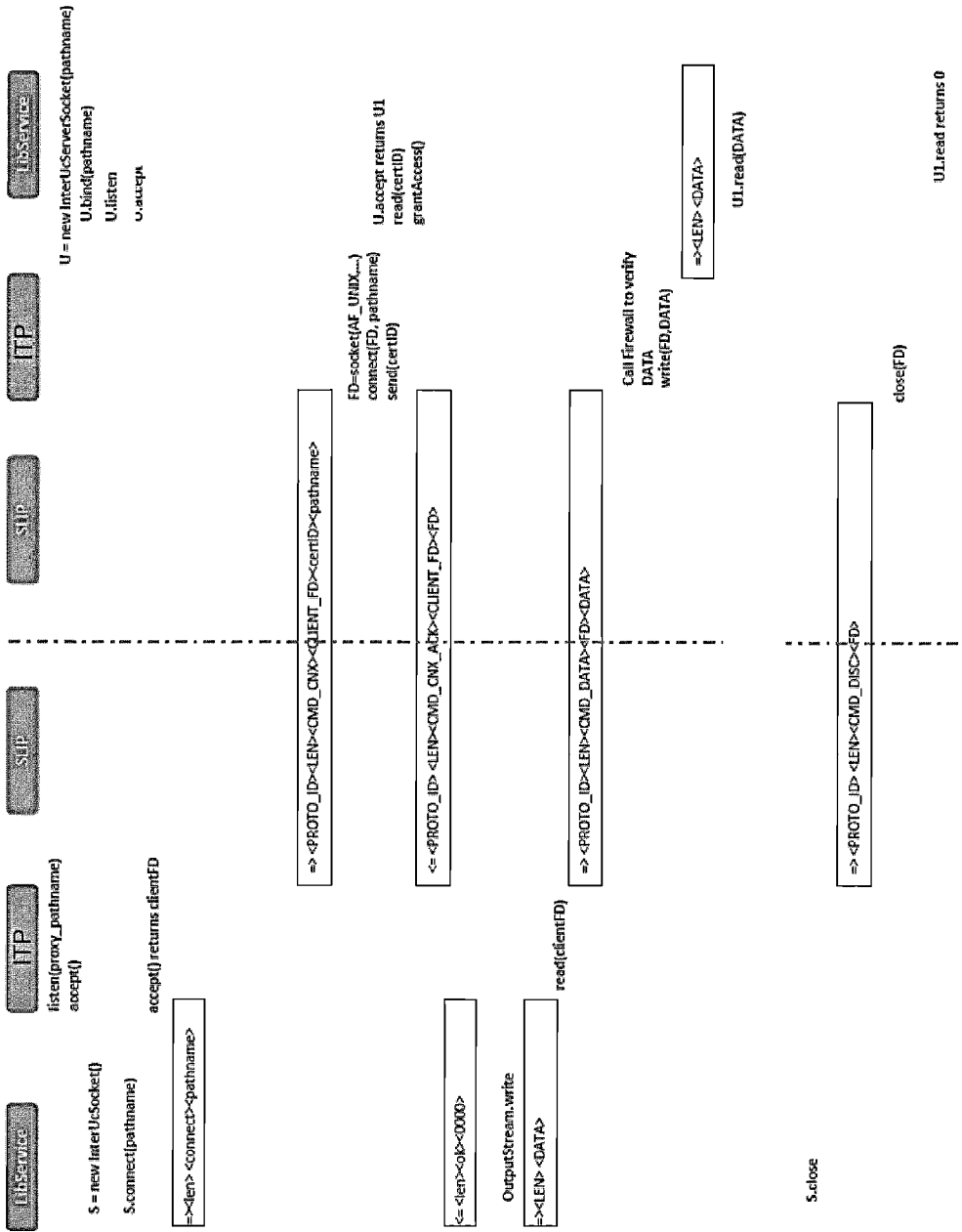
FIG. 3 shows the protocol implemented for a request such as that illustrated on FIG. 2.
Figure 4:
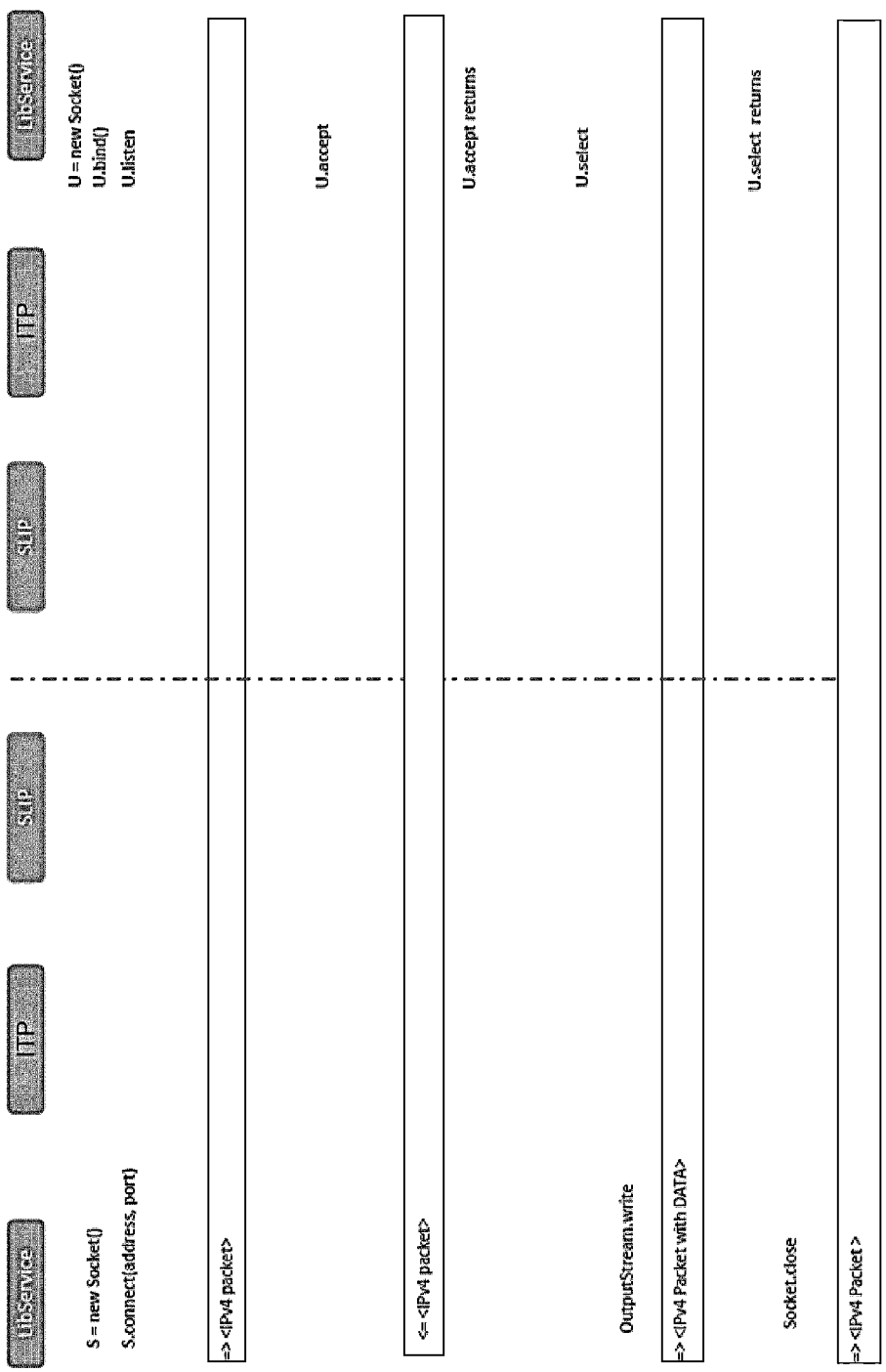
FIG. 4 shows the protocol implemented for the transmission of TCP/IP type packets.

FIG. 3 shows a set of steps leading to the transmission of data in a device as described herein via specialised ITP components. FIG. 4 shows the transmission of TCP/IP packets, using the same ITP components.

The ITP component receives its data from the LibService component (LibServ) (Java/JNI socket) which itself received this data from the calling application (App). For the LibService component (LibServ), the principle consists in formatting the data so that it can be transmitted, via the ITP component of the open device, to the corresponding ITP component of the secure module, according to a datapath principle. The LibService component (LibServ) also builds the session data (endpoints). The LibService component (LibServ) receives, from the application APP, a request to obtain data and/or to implement a service for the secure module. The LibService component (LibServ) makes a request to the ITP component for the implementation of an effective transmission of data. The ITP component accepts this implementation by returning an identifier (clientFD). This acceptance follows a mutual acceptance by the Lib-Service component (LibServ) of the secure module. Then, the LibService component (LibServ) of the open module builds, using the data supplied by the application APP, a request intended for the LibService component (LibServ) of the secure module, said request comprising the identification of the formatted data (proto_id), the length of the data, the connection command, the identifier (clientFD, buffer identifier), a certificate identifier (CertID) and a pathname. The pathname targets a special application on the secure module. This data is then transmitted to the secure module using the principle described previously (ITP component, SLIP component, SPI component—SPI component, SLIP component, ITP component).

The ITP component of the secure module receives and checks the data, in particular the pathname and the calling application (APP). If this data corresponds to authorised data (in particular as regards the calling application and the targeted pathname), it sends an acknowledgement of receipt to the ITP component of the open module which relays this information to the LibSery component of the open device. Then, the LibService component of the open module receives the data from the calling application, formats it (protobuff) and transmits it (it deposits the data on the corresponding buffer) to the ITP component of the open device. The ITP component of the open module produces a request using the data deposited in the buffer (clientFD) and transmits the data of this request to the secure module using the principle described previously (ITP component, SLIP component, SPI component—SPI component, SLIP component, ITP component). Upon reception of this data, the ITP component of the secure module requests the checking and filtering component (FW) to determine firstly whether the data is correctly formatted and secondly whether it can be accepted. If this is the case, the data is written in a buffer corresponding to the buffer (ClientFD) of the secure module. The LibSery component of the secure module receives this data in the buffer (ClientFD) and transmits it to the targeted service (SERV) in the pathname.

Note that according to the invention, as shown on FIG. 4, traditional TCP/IP packets can also be transmitted by using the LibService components of the open and secure devices respectively. To do this, the LibService component requests the creation of a "traditional" session (in the traditional TCP/IP) by logging on to an IP address and a port determined with the device (open or secure) to which it is connected. More particularly on FIG. 3, the ITP component is listening for the processing of a transmission of data between the transmitting device and the receiving device. To do this, the ITP component listens to a special "channel", represented by a proxy pathname. The LibService component of the transmitting device (the open device on FIG. 3) defines a new inter-CPU transmission channel, by connecting it to the previously opened channel. A similar system is implemented for the receiving device, in order to listen to the channel installed between the two processors. After acceptance by the two devices, the proxy protocol is implemented, in particular by serialising and formatting (protocolBuffer) the data to be transmitted. The data in the buffer of the transmitting device is transmitted to the buffer of the receiving device, after a step of checking a certificate (CertID) attached to an initialisation phase: during this phase, the certificate CertId is checked and the buffer receiving the data is created on the receiver side. A formatted acknowledgement of receipt is transmitted by the ITP component of the receiver to the ITP component of the transmitter to indicate that the transmission request has been accepted and confirm the creation of the reception buffer. The LibService component is then informed by the ITP component.

Upon reception of this confirmation, the LibService component transmits the data to be transmitted to the receiver: it informs the ITP component of the length (LNE) of this data and then provides the data concerned: to do this, the length and the data of this length are inserted in the buffer previously created by the ITP component. The ITP component reads this buffer, formats and serialises the data intended for the ITP component of the receiver. Upon reception, the ITP component uses a firewall which checks firstly the formatting of the data received and secondly its actual source. If the firewall does not detect any problems concerning this data, the data is written in the destination buffer and made available (reverse formatting) to the LibService component of the receiver which reads this data. These transmission steps can be repeated as many times as necessary until all the data has been transmitted. When all the data has been transmitted, the LibService component of the transmitter informs the ITP component that transmission has finished by closing the transmission channel. The ITP component of the transmitter then informs its counterpart of the receiver for it to clear the reception buffer and close the connection.

More particularly, on FIG. 4, the LibService component of the transmitter opens a transmission channel and logs on to an IP address and a given port. The LibService component of the receiver installs the tunnel in order to transmit a first transmission notification packet. The LibService component of the receiver accepts the packet received and informs the LibService component of the receiver accordingly. The LibService component of the transmitter then transmits as many packets as necessary, until it closes the tunnel. The packets are transmitted and received, in this case, without using the checking and filtering component (firewall) since this type of data transmission does not concern, a priori, protected or confidential data.

According to this technique, the network and transport layers are either processed by the TCP component and the IP component of the standard stack or via the ITP component in case of data exchanged between the open module and the secure module.

More particularly, the ITP component:
shows the Berkeley sockets such as the APIs between the applications stored on secure and open modules (devices);
manages the maximum transmission unit (MTU);
ensures that the application stored on the open module (device) is authorised to access the services of the secure module (device):
a. when creating the socket, on the open device, the ITP examines the authorisation of the calling application to request the creation of such a socket;
b. when connecting the socket to the secure module, A-ITP transfers the authorisation to T-ITP which accepts or refuses the connection;
c. T-ITP sends the decision to A-ITP which sends it to the calling application;
authorises two transfer modes:
a. command/response in both directions;
b. multimedia buffer.

Figure 5:
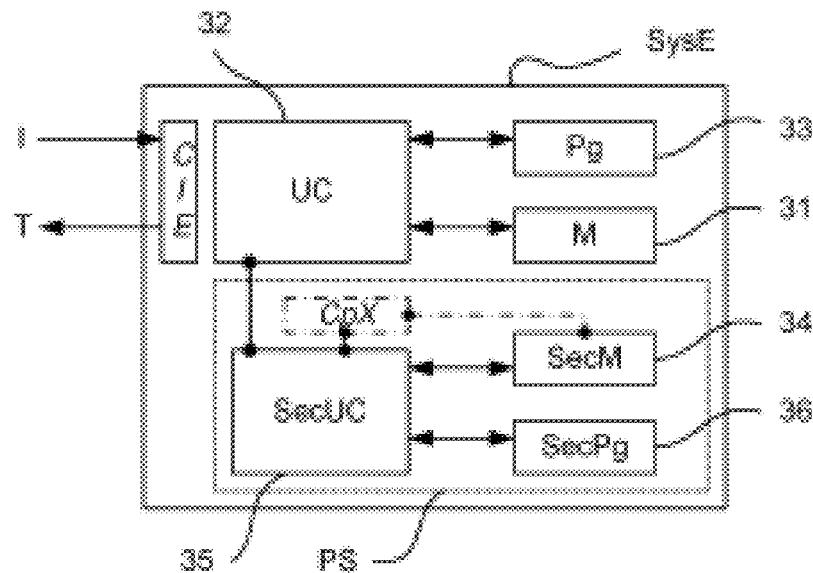
FIG. 5 represents a simplified physical architecture of the device according to the invention.

FIG. 5 shows a simplified architecture of an electronic device (SystE) adapted to process transmissions as described previously. An electronic device comprises a first electronic module comprising a memory 31, a processing unit 32 equipped for example with a microprocessor, and controlled by a computer program 33. The electronic device also comprises a second electronic module comprising a secure memory 34, which can be merged with the memory 31 (as shown in dotted lines, in this case the memory 31 is a secure memory), a secure processing unit 35 equipped for example with a secure microprocessor and with physical protection measures (physical protection around the chip, by lattice, vias, etc. and protection on the data transmission interfaces), and controlled by a computer program 36 specifically dedicated to this secure processing unit 35, this computer program 36 implementing all or part of the method for processing a transaction as described previously. The group composed of the secure processing unit 35, the secure memory 34 and the dedicated computer program 36 forms the secure module (PS) of the electronic device. In at least one embodiment, this technique is implemented as a set of programs installed partly or totally on this secure portion of the transaction processing terminal. In at least one other embodiment, this technique is implemented as a dedicated component (CpX) capable of processing data of the processing units and installed partly or totally on the secure portion of the processing device. In addition, the device also comprises communication means (CIE) consisting for example of network components (WiFi, 3G/4G/5G, wire) allowing the device to receive data (I) from entities connected to one or more communication networks and to transmit processed data (T) to such entities.

Figure 6:
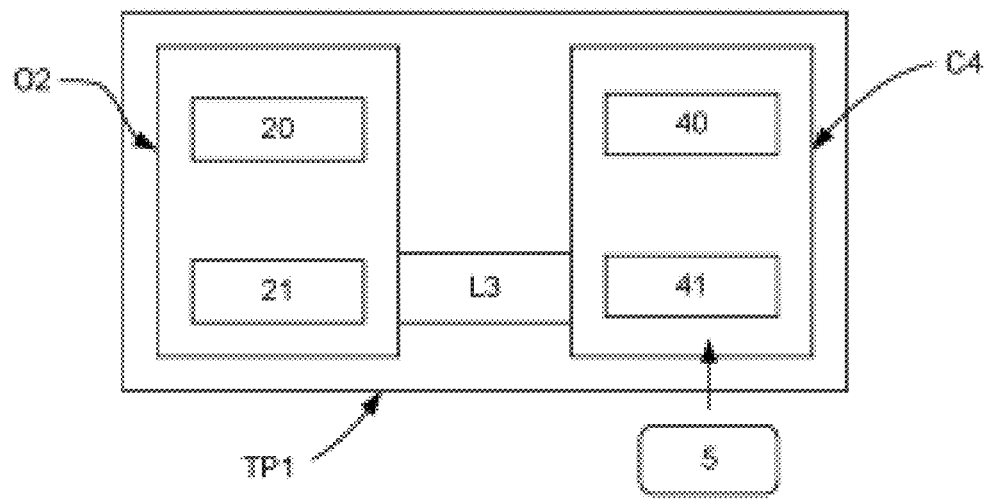
FIG. 6 is another representation of the physical architecture of the device according to the invention, highlighting the link between the two processors of the two devices forming the device.

Such a device comprises, depending on the embodiments:
means for obtaining data from the transactional devices presented by the users (access card, transaction card, etc.; these means may consist, for example, of a chip card reader, or contactless card readers of the NFC or RFID type);
entry means, allowing the user to enter one or more data items to implement the transaction, whenever necessary (physical entry keyboard, screen, virtual entry keyboard)
means for processing the data obtained by the means for obtaining data from the transactional devices and means for processing the data entered by the user;
these means consist for example of a specialised component;
means for processing a transaction;
means for supplying data to one or more transactional servers connected to the device;

As explained previously, these means are implemented via modules and/or components, for example secure. They thus ensure the security of the transactions performed while guaranteeing greater maintainability of the device. FIG. 6 is another representation of a processing device in which this invention is implemented in a special embodiment. Such a modular processing device comprises a first module O2, such as an open module (i.e. comprising an open operating device), connected using a physical connection L3 (of type SPI/UART) to a second module C4, closed module, called the payment module. The payment module C4 can execute operations concerning secure transactions such as payment transactions.

The first module O2 comprises in particular a user interface 21 and a processor 20. The user interface 21 may consist, in one embodiment of the invention, of an alphanumeric keyboard and a screen. In another embodiment of the invention, the user interface 21 can be a touch screen. The module O2 includes a first operating device OS1, such as for example the Android™ operating device. The physical connection L3 is a wire connection used to physically connect the two modules O2 and C4.

The payment module C4 comprises a processor 40 as well as a payment card reader 41. In a first implementation, the payment card reader 41 is a secure card reader (magnetic and/or contact IC and/or contactless IC) using a suitable connection to exchange data with a payment card 5. The payment module C4 includes a second specific and secure operating device OS2 capable of executing the operations concerning secure transactions such as payment transactions.

The invention claimed is:
1. A computer-implemented method for transmitting data between two electronic modules in an electronic device,
wherein the electronic device comprises:
a first electronic module being an open module comprising a general-purpose processor; and
a second electronic module being a secure module comprising a secure processor;

wherein the open and secure modules are combined in the electronic device;
wherein the open module executes a first operating system and the secure module executes a second operating system;
wherein the open module comprises a hybrid communication stack comprising components of network layers according to an Open Systems Interconnection (OSI) model and, alongside the components of layers 3 and 4 of the OSI model, a specialized data transmission component (ITP) managing both a network layer and a transport layer functionality and connecting the layers 3 and 4 of the OSI model; and
wherein the secure module also comprises components of network layers according to the OSI model and, alongside the components of layers 3 and 4 of the OSI model, a hybrid communication stack comprising a specialized data transmission component (ITP) managing both the network layer and the transport layer functionality and connecting the layers 3 and 4 of the OSI model;
the method comprising steps of:
receiving, by a session management component (LibService) of the hybrid communication stack of the open module, from an application (APP) running on the open module, of a request to transmit data to a destination application (Serv) running on the secure module;
determining, by the session management component (LibService), a channel to transmit said data which is required by the application (APP), depending on content of said request; and
wherein when the application (APP) requests to transmit said data via the specialized data transmission component (ITP), a step of implementing the specialized data transmission component (ITP) of the open module to transmit the data to the specialized data transmission component (ITP) of the secure module.

2. The method for transmitting data according to claim 1, wherein the step of implementing said specialized data transmission component (ITP) of the open module comprises, before this implementation, at least one step of checking an authorization to transmit data from the application (APP) to the destination application (Serv).

3. The method for transmitting data according to claim 1, wherein the step of implementing said specialized data transmission component (ITP) of the open module comprises at least one data serialization step, according to a predetermined serialization format.

4. The method for transmitting data according to claim 1, wherein the step of implementing said specialized data transmission component (ITP) of the open module comprises:
opening a connection intended for a LibService component of the hybrid stack of the secure module;
creating, by an ITP component of the hybrid stack of the secure module, of a buffer for receiving the data to be transmitted;
formatting, by the ITP component of the hybrid stack of the secure module, a buffer opening request intended for an ITP component of the hybrid stack of the secure module, said opening request comprising at least one identifier of the buffer for receiving the data to be transmitted and a pathname required for the transmission of said data;
transmitting said buffer opening request;
receiving, from the ITP component of the hybrid stack of the secure module, an acknowledgement of receipt of said request; and
when the acknowledgement of the receipt authorizes the data transmission:
transmitting said data to said ITP component of the hybrid stack of the secure module; and
closing the connection to the LibService component of the hybrid stack of the secure module.

5. The method for transmitting data according to claim 4, wherein the buffer opening request comprises a buffer identifier (FD) and a certificate identifier (CertID).

6. The method for transmitting data according to claim 5, further comprising, in the secure module, a step of checking said certificate identifier, and when the checking of said certificate identifier delivers a negative result, a step of closing the connection.

7. The method for transmitting data according to claim 5, further comprising, in the secure module, a step of checking said certificate identifier, and when the checking of said certificate identifier delivers a positive result, a step of transmitting the acknowledgement of receipt of said buffer opening request.

8. The method for transmitting data according to claim 4, wherein after the receiving of said data by said ITP component of the hybrid stack of the secure module, the method comprises a step of submitting the data to a filtering component (firewall); and when said data does not correspond to data expected for the destination application (Serv), a step of rejecting said transmitted data.

9. An electronic device, comprising:
a first electronic module being an open module comprising a general-purpose processor, combined with a second electronic module being a secure module comprising a secure processor;
wherein the open module executes a first operating system and the secure module executes a second operating system;
wherein the open module comprises a hybrid communication stack comprising components of network layers according to an Open Systems Interconnection (OSI) model and, alongside the components of layers 3 and 4 of the OSI model, a specialized data transmission component (ITP) managing both a network layer and a transport layer functionality and connecting the layers 3 and 4 of the OSI model; and
wherein the secure module also comprises components of network layers according to the OSI model and, alongside the components of layers 3 and 4 of the OSI model, a hybrid communication stack comprising a specialized data transmission component (ITP) managing both the network layer and the transport layer functionality and connecting the layers 3 and 4 of the OSI model,
the device further comprising:
means for receiving, by a session management component (LibService) of the hybrid communication stack of the open module, from an application (APP) running on the open module, a request to transmit data to a destination application (Serv) running on the secure module;
means for determining, by the session management component (LibService), a channel to transmit said data which is required by the application, depending on content of said request; and
means for implementing said specialized data transmission component (ITP) of the open module to transmit the data to the specialized data transmission component (ITP) of the secure module executed when the application (APP) requests to transmit said data via the specialized data transmission component (ITP).

10. A computer program product comprising program code instructions, stored on a non-transitory computer-readable storage medium, for the executing the method according to claim 1 on a processor.

* * * * *